(12) United States Patent
Lortz et al.

(10) Patent No.: US 8,911,638 B2
(45) Date of Patent: Dec. 16, 2014

(54) SILICON DIOXIDE DISPERSION COMPRISING POLYOL

(75) Inventors: Wolfgang Lortz, Waechtersbach (DE); Christoph Batz-Sohn, Hanau-Mittelbuchen (DE); Helmut Mangold, Rodenbach (DE); Gabriele Perlet, Grosskrotzenburg (DE); Werner Will, Gelnhausen (DE); Sascha Reitz, Bruchkoebel (DE)

(73) Assignee: Degussa AG, Duesseldorf (DE)

( * ) Notice: Subject to any disclaimer, the term of this patent is extended or adjusted under 35 U.S.C. 154(b) by 1743 days.

(21) Appl. No.: 11/571,441

(22) PCT Filed: Jun. 16, 2005

(86) PCT No.: PCT/EP2005/006481
§ 371 (c)(1),
(2), (4) Date: Dec. 29, 2006

(87) PCT Pub. No.: WO2006/002773
PCT Pub. Date: Jan. 12, 2006

(65) Prior Publication Data
US 2009/0261309 A1    Oct. 22, 2009

(30) Foreign Application Priority Data
Jul. 1, 2004   (DE) .......................... 10 2004 031 785

(51) Int. Cl.
E04B 1/74    (2006.01)
C01B 33/12   (2006.01)
C01B 33/148  (2006.01)
B32B 17/06   (2006.01)
C09C 1/30    (2006.01)

(52) U.S. Cl.
CPC ........... *C01B 33/1485* (2013.01); *B32B 17/069* (2013.01); *C09C 1/3072* (2013.01); *C01P 2004/50* (2013.01); *C01P 2004/62* (2013.01); *C01P 2006/12* (2013.01); *C01P 2006/22* (2013.01)
USPC .............................. 252/62; 423/335; 423/339

(58) Field of Classification Search
USPC ............ 51/309; 106/3; 423/335, 339; 252/62
See application file for complete search history.

(56) References Cited

U.S. PATENT DOCUMENTS

| | | | |
|---|---|---|---|
| 2,984,629 A | 5/1961 | Loftman et al. | |
| 3,004,921 A * | 10/1961 | Stossel | 516/34 |
| 3,046,234 A * | 7/1962 | Roman et al. | 516/87 |
| 3,655,578 A | 4/1972 | Yates et al. | |
| 6,641,870 B2 | 11/2003 | Bartkowiak et al. | |
| 6,663,683 B2 * | 12/2003 | Lortz et al. | 51/308 |
| 6,676,719 B2 | 1/2004 | Lortz et al. | |
| 6,767,377 B2 | 7/2004 | Schumacher et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,905,632 B2 | 6/2005 | Lortz et al. | |
| 6,991,190 B2 | 1/2006 | Lortz et al. | |
| 7,015,270 B2 | 3/2006 | Scharfe et al. | |
| 7,083,769 B2 | 8/2006 | Moerters et al. | |
| 7,244,302 B2 | 7/2007 | Schumacher et al. | |
| 7,255,735 B2 | 8/2007 | Meyer et al. | |
| 7,399,487 B2 | 7/2008 | Batz-Sohn et al. | |
| 7,470,423 B2 | 12/2008 | Lortz et al. | |
| 7,538,142 B2 | 5/2009 | Lortz et al. | |
| 7,572,854 B2 | 8/2009 | Schneider et al. | |
| 7,615,577 B2 | 11/2009 | Lortz et al. | |
| 7,645,335 B2 | 1/2010 | Lortz et al. | |
| 7,749,322 B2 | 7/2010 | Schumacher et al. | |
| 7,780,777 B2 | 8/2010 | Perlet et al. | |
| 7,781,520 B2 | 8/2010 | Standke et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 8,039,110 B2 | 10/2011 | Jenkner et al. | |
| 2001/0042493 A1 | 11/2001 | Scharfe et al. | |
| 2002/0134027 A1 | 9/2002 | Lortz et al. | |

(Continued)

FOREIGN PATENT DOCUMENTS

| | | | |
|---|---|---|---|
| DE | 197 20 269 | 11/1998 | |
| WO | 2004 035473 | 4/2004 | |
| WO | WO/2004/020334 | * 11/2004 | .............. C01B 33/18 |

OTHER PUBLICATIONS

U.S. Appl. No. 13/257,488, filed Oct. 21, 2011, Standke et al.
U.S. Appl. No. 13/256,557, filed Sep. 14, 2011, Scharfe et al.

*Primary Examiner* — Shuangyi Abu Ali
(74) *Attorney, Agent, or Firm* — Oblon, Spivak, McClelland, Maier & Neustadt, L.L.P.

(57) ABSTRACT

Stable, pourable silicon dioxide dispersion, in which the average, number-related aggregate diameter of the silicon dioxide particles in dispersion is less than 200 nm, and which comprises at least 35 wt. % of a silicon dioxide powder, 3 to 35 wt. % of at least one polyol, 20 to 60 wt. % of water, 0 to 10 wt. % of an additive and a substance having an alkaline action in an amount such that a pH of 10<pH<12 is established. It can be prepared by a procedure in which silicon dioxide powder is introduced into water and a polyol in a rotor/stator machine, the pH being less than 5, and the mixture is dispersed until the current uptake of the rotor/stator machine is largely constant, and a substance having an alkaline action is subsequently added in an amount such that a pH of the dispersion of 10<pH<12 results, the substance having an alkaline reaction being added so rapidly that no gel formation takes place. It can be used as a component of a flame-retardant filling of hollow spaces between building components, in particular for insulating glass arrangements.

22 Claims, No Drawings

(56) References Cited

U.S. PATENT DOCUMENTS

| | | |
|---|---|---|
| 2002/0197311 A1 | 12/2002 | Hasenzahl et al. |
| 2003/0108580 A1 | 6/2003 | Hasenzahl et al. |
| 2003/0228271 A1 | 12/2003 | Batz-Sohn et al. |
| 2004/0106697 A1 | 6/2004 | Lortz et al. |
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0093542 A1* | 5/2006 | Schumacher et al. ........ 423/335 |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0110906 A1 | 5/2007 | Edelmann et al. |
| 2007/0231280 A1 | 10/2007 | Schumacher et al. |
| 2007/0297998 A1 | 12/2007 | Meyer et al. |
| 2008/0058489 A1 | 3/2008 | Edelmann et al. |
| 2008/0095724 A1 | 4/2008 | Hasenzahl et al. |
| 2008/0187673 A1 | 8/2008 | Standke et al. |
| 2008/0206572 A1 | 8/2008 | Edelmann et al. |
| 2008/0213325 A1 | 9/2008 | Schumacher et al. |
| 2008/0221318 A1 | 9/2008 | Edelmann et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2010/0117021 A1 | 5/2010 | Batz-Sohn et al. |
| 2010/0119851 A1 | 5/2010 | Giessler-Blank et al. |
| 2010/0159144 A1 | 6/2010 | Standke et al. |
| 2010/0191001 A1 | 7/2010 | Wassmer et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0143147 A1 | 6/2011 | Edelmann et al. |
| 2011/0144226 A1 | 6/2011 | Spyrou et al. |
| 2011/0259240 A1 | 10/2011 | Jenkner et al. |
| 2011/0268899 A1 | 11/2011 | Albert et al. |

* cited by examiner

SILICON DIOXIDE DISPERSION COMPRISING POLYOL

The invention relates to a stable silicon dioxide dispersion of high filler content which comprises a polyol, and to the preparation and use thereof.

It is known to employ silicon dioxide dispersions of high filler content for thermal insulations, in particular for insulating glasses.

DE-A-19943103 describes a dispersion having a content of amorphous silicon dioxide of more than 80 wt. %. In this context, amorphous is to be understood as meaning a silicon dioxide of very low surface area, preferably having a BET surface area of 0.001 to 0.5 $m^2/g$. Although it is described as being very readily pourable, the dispersion claimed nevertheless retains this property for only a short time, of not more than 2 hours. This means that such a dispersion must be processed immediately after its preparation, that is to say can be neither stored nor transported.

DE-A-19720269 describes a dispersion having a content of nanoscale particles, for example silicon dioxide, of at least 35 wt. %. This dispersion furthermore comprises 1 to 40% of water or an organic solvent, and furthermore 10 to 60 wt. % of a compound having at least two functional groups, preferably a polyol. This dispersion also has only a very low stability and must be processed rapidly. It has been found that even with higher-energy dispersing conditions, nothing changes in this behaviour.

The object of the invention is to provide a dispersion of high filler content which comprises silicon dioxide, is stable over a relatively long period of time and has a low viscosity. In particular, it should show advantages over dispersions according to the prior art in the production of insulating glasses.

The invention provides a stable, pourable silicon dioxide dispersion in which
  the average, number-related aggregate diameter of the silicon dioxide particles in dispersion is less than 200 nm, and which comprises
  at least 35 wt. % of silicon dioxide powder,
    3 to 35 wt. % of at least one polyol,
    20 to 60 wt. % of water,
    0 to 10 wt. % of an additive, in each case based on the total amount of the dispersion,
  and which comprises a substance having an alkaline action in an amount such that a pH of 10<pH≤12 is established.

In the context of the invention, stable is to be understood here as meaning that the silicon dioxide dispersion shows no noticeable sedimentation within a period of time of at least one month, as a rule at least 3 months. That is to say, the dispersion can be employed during the period of time without further filtration steps. Furthermore, no or only a minimal increase in the viscosity is to be observed within this period of time. This means that within this period of time the silicon dioxide dispersion retains its property of being pourable at room temperature.

The silicon dioxide dispersion according to the invention can comprise additives in the form of biocides or dispersing auxiliaries. For many uses, however, these additives may prove to be a disadvantage, so that it may be advantageous if the dispersion according to the invention comprises no such additives.

The origin of the silicon dioxide powder employed is not decisive. Thus, for example, silicon dioxide powder prepared by precipitation or by pyrogenic processes can be present in the dispersion. However, it has been found that pyrogenically prepared metal oxide powders can advantageously be employed.

Pyrogenically prepared metal oxide powders are generally understood as meaning those which are obtained from a metal oxide precursor by a flame hydrolysis or flame oxidation in an oxyhydrogen flame. In this process, approximately spherical primary particles are initially formed, these sintering together to aggregates during the reaction. The aggregates can then accumulate into agglomerates. In contrast to the agglomerates, which as a rule can be separated into the aggregates relatively easily by introduction of energy, the aggregates are broken down further, if at all, only by intensive introduction of energy.

Silicon dioxide is as a rule prepared by flame hydrolysis of silicon tetrachloride. In the case of pyrogenic processes, silicon-metal mixed oxides or silicon dioxides doped with metal oxide can also be obtained by joint flame hydrolysis or flame oxidation. In addition to pyrogenically prepared silicon dioxide powder, the silicon dioxide dispersion according to the invention can advantageously also comprise potassium-doped silicon dioxide powder, the preparation of which is described, for example, in DE-A-10065028.

The pyrogenically prepared silicon dioxide powder has a specific surface area of preferably 5 to 500 $m^2/g$, and particularly preferably 30 to 60 $m^2/g$.

The choice of polyol is not limited, as long as it remains miscible with water. Suitable polyols can be glycerol, ethylene glycol, trimethylolpropane, pentaerythritol, sorbitol, polyvinyl alcohol, polyethylene glycol or a mixture thereof. Glycerol is particularly preferred in this context.

The choice of the substance having an alkaline action likewise is not limited, as long as it is soluble in the liquid phase of water and polyol. It has been found that alkali metal hydroxides, amines, (alkyl)ammonium hydroxides and/or amino alcohols are preferred. Potassium hydroxide is particularly preferred.

A silicon dioxide dispersion according to the invention which is particularly preferred can be one which comprises
  38 to 60 wt. % of pyrogenically prepared silicon dioxide powder having a BET surface area of 30 to 60 $m^2/g$,
  5 to 25 wt. % of glycerol
  25 to 50 wt. % of water and
  0.3 to 0.7 wt. % of KOH.

Any impurities of the starting substances and substances formed during the preparation of the dispersion are included in this. In particular, dispersions of pyrogenically prepared silicon dioxide powder have an acidic pH as a result of the preparation, due to adhering residues of hydrochloric acid. These hydrochloric acid residues are neutralized to potassium chloride by the KOH present in the dispersion.

The invention also provides a process for the preparation of the silicon dioxide dispersion according to the invention, in which
  from a reservoir, water, at least one polyol and optionally an additive are circulated via a rotor/stator machine in an amount corresponding to the composition desired later, and
  the amount of silicon dioxide powder desired for the dispersion is introduced via a filling device, continuously or discontinuously and with the rotor/stator machine running, into the shearing zone between the slits of the rotor teeth and the stator slits, the pH being less than 5 and optionally being adjusted by metering in of an acid,
  the filling device is closed and dispersing is carried out further until the current uptake of the rotor/stator machine is largely constant, and an amount of a substance having an alkaline action such that a pH of the dispersion of 10<pH≤12 results is then added, the substance having an alkaline action being added so rapidly that no gel formation takes place.

The silicon dioxide dispersion according to the invention can furthermore be obtained by a process in which
a mixture of water, at least one polyol, optionally an additive and silicon dioxide powder is initially introduced into the dispersing vessel in an amount corresponding to the composition desired later,
dispersing is carried out by means of a planetary kneader at a pH of less than 7, and
a substance having an alkaline action is then added in an amount such that a pH of the dispersion of 10<pH≤12 results.

In both processes it is advantageous to employ an aqueous solution having the highest possible concentration as the substance having an alkaline action, in order not to dilute the dispersion too much. Substances having an alkaline action with a concentration of 20 to 50 wt. % can preferably be employed, potassium hydroxide solution being particularly preferred.

The processes can also be carried out by a procedure in which the addition of the polyol takes place only after the dispersing of the silicon dioxide powder and before the addition of the substance having an alkaline action.

The dispersion according to the invention can furthermore be obtained by a procedure in which at least two part streams of the dispersion prepared as described above with a rotor/stator or planetary kneader are placed under a pressure of up to 3,500 kg/cm² and let down via a nozzle and the part streams are allowed to collide with one another.

The invention also provides the use of the silicon dioxide dispersion according to the invention as a component of a flame-retardant filling of hollow spaces between structural components, in particular between insulating glass arrangements.

In addition, the silicon dioxide dispersion according to the invention can also be used as a component of a filling of hollow spaces between structural components of plastic, metal, wood, plaster board, fermacel, pressboard, ceramic and natural or artificial stone, as well as in electric cables, for fireproofing purposes.

It can also be employed as a coating composition for structural components, and is suitable for the production of thermally and mechanically stable foams in the form of, for example, bulk goods or mouldings.

The dispersion according to the invention can also be used in a mixture with pigments or (organic or inorganic, for example fibrous, pulverulent or lamellar) coarser, non-nanoscale additives, such as, for example, mica pigments, iron oxides, wood flour, glass fibres, metal fibres, carbon fibres, sands, clays and bentonite, if the transparency of the material which can thereby be produced is not important.

EXAMPLES

Example 1

42.5 kg of completely demineralized water and 2.25 kg glycerol are initially introduced into a high-grade steel mixing container. 60 kg AEROSIL® OX50 are then sucked in under shearing conditions with the aid of the suction pipe of a rotor/stator machine (Ystral Conti-TDS 3, stator slits: 4 mm ring and 1 mm ring, rotor/stator distance approx. 1 mm, speed of rotation 3,000 rpm). The pH is lowered to 3.7 during this procedure. Thereafter, 9 kg water, 3.75 kg glycerol and, under the same dispersing conditions, swiftly 2.02 kg 30 percent strength by weight potassium hydroxide solution are added in succession.

Examples 2 to 9 are carried out analogously, and in Example 10 no potassium hydroxide solution is added. The amounts employed for the preparation of the dispersions can be seen from Table 1.

The composition of the dispersions and the physico-chemical values thereof are reproduced in Table 2. Example 3a shows the values of a dispersion from Example 3 subsequently ground under 2,500 bar with a high-energy mill.

Examples 1 to 8 are dispersions according to the invention, Examples 9 and 10 are comparison examples.

In Example 11, the silicon dioxide dispersion is first dispersed at a higher silicon dioxide concentration and diluted to the desired concentration before the addition of potassium hydroxide solution.

Example 11

36.1 kg of completely demineralized water and 9.0 kg glycerol are initially introduced into a high-grade steel mixing container. 60 kg AEROSIL® OX50 are then sucked in under shearing conditions with the aid of the suction pipe of a rotor/stator machine (Ystral Conti-TDS 3, stator slits: 4 mm ring and 1 mm ring, rotor/stator distance approx. 1 mm, speed of rotation 3,000 rpm) and sheared for 15 minutes. The $SiO_2$ concentration is 57 wt. %. The pH is lowered to 3.5 during this procedure by the "acidic" AEROSIL®. Thereafter, 15.2 kg glycerol are added and, after some minutes of homogenization, a pH of 10.9 is swiftly established with 2.2 kg 30 percent strength by weight potassium hydroxide solution under the same dispersing conditions. Finally, a further 1.0 kg water is added in order to establish an $SiO_2$ concentration of 48.6 and a glycerol concentration of 19.6. The pH is changed only insignificantly by this small amount of water.

The dispersions according to the invention of Examples 1 to 8 and 11 all have a very low viscosity. The average aggregate diameter (number-related) of the silicon dioxide particles in the dispersion is less than 150 nm.

The dispersion from Example 11, which is obtained by dispersing at a high silicon dioxide content and subsequent dilution to the desired concentration, shows advantages over the process in which the dispersing is carried out directly with the desired concentration. The grinding is more intense and the viscosity of the dispersion is lower.

The dispersion according to the invention from Example 3a, prepared by high-energy grinding, shows a further reduction in the viscosity and particle size.

Example 7a gives the values of dispersion 7 after storage in a climatically controlled chamber for three months. In this, the temperatures are varied daily between 10° C. and 50° C. Even after three months, the silicon dioxide dispersion according to the invention still shows excellent viscosity values.

Dispersion 8, with a pH of 11.8, shows a very low viscosity. A further increase in the pH indeed lowers the viscosity further, but initial dissolving of the silicon dioxide particles is already to be observed. Potash silicates are increasingly formed, depending on the temperature and time, due to the initial dissolving of the silicon dioxide. As the reaction progresses, a potash water-glass with an increasing $SiO_2/K_2O$ ratio is increasingly formed from the dilute low-viscosity potassium hydroxide solution as a homogeneous phase. Since potassium hydroxide solution is consumed in this reaction, KOH would have to be added again to maintain a high pH, but as a result of this the potash water-glass reaction is also accelerated again. However, potash water-glasses show a marked increase in viscosity as the $SiO_2/K_2O$ ratio and concentration increase. In order to suppress such time- and temperature-dependent reactions, a pH of below 12 is essential.

At alkaline pH values of less than 10, a significant increase in the viscosity is likewise to be observed (Example 9). A dispersion without the addition of KOH shows a significantly higher viscosity and gels within days (Example 10).

It is surprising that the polyol-containing silicon dioxide dispersion according to the invention has low viscosities only at a pH of more than 10. It is known that in purely aqueous dispersions which comprise no polyol, the lowering in viscosity already starts from a pH of approx. 9.

In the preparation of the silicon dioxide dispersion according to the invention, it is essential that the silicon dioxide powder is first dispersed in the acidic range at a pH of 5 or less and the substance having an alkaline action is added rapidly under the same dispersing conditions. If the substance having an alkaline action is added slowly, rapid gel formation takes place.

then adding an amount of a substance having an alkaline action so that a dispersion pH of $10<pH\leq12$ results, said substance having an alkaline action being added such that no gel formation takes place;

to obtain said silicon dioxide dispersion which is stable and pourable;

wherein an average, number-related aggregate diameter of silicon dioxide particles in dispersion is less than 200 nm, said pourable silicon dioxide dispersion comprising:

at least 35 wt. % of said silicon dioxide powder, based on the total amount of the dispersion, 10 to 35 wt. % of said at least one polyol, based on the total amount of the dispersion, 20-55 wt. % of water, based on the total amount of the dispersion, 0 to 10 wt. % of an additive, based on the total amount of the dispersion, and said substance having an alkaline action in an amount so that a pH of $10<pH\leq12$ is established; and

TABLE 1

Starting substances and starting substance amounts (in kg) for the preparation of the dispersions

| Example | 1 | 2 | 3 | 4 | 5 | 6 | 7 | 8 | 9[e] | 10[e] | 11 |
|---|---|---|---|---|---|---|---|---|---|---|---|
| $SiO_2$[a] | 60.00 | 95.00 | 57.84 | 57.84 | 57.84 | 45.79 | 45.79 | 45.79 | 45.79 | 45.79 | 60.00 |
| Glycerol | 6.00 | 19.00 | 6.00 | 12.00 | 18.00 | 18.62 | 18.62 | 18.62 | 18.62 | 18.62 | 24.20 |
| Water | 51.50 | 72.00 | 54.33 | 48.34 | 42.01 | 29.00 | 28.46 | 27.71 | 29.54 | 30.59 | 37.10 |
| KOH[b] | 2.02 | 3.70 | 1.63 | 1.59 | 1.54 | 1.60 | 2.10 | 2.90 | 1.10 | 0 | 2.20 |

[a] Aerosil ® OX50;
[b] 30 wt. % strength KOH in water;
[e] comparison example;

TABLE 2

Composition and physico-chemical values of the dispersions

| Example | | 1 | 2 | 3 | 3a[c] | 4 | 5 | 6 | 7 | 7a[d] | 8 | 9[e] | 10[e] | 11 |
|---|---|---|---|---|---|---|---|---|---|---|---|---|---|---|
| $SiO_2$ | wt. % | 50.2 | 50.1 | 48.3 | 48.3 | 48.3 | 48.4 | 48.2 | 48.2 | 48.2 | 48.2 | 48.2 | 48.2 | 48.6 |
| Glycerol | wt. % | 5.0 | 10.0 | 5.0 | 5.0 | 10.0 | 15.1 | 19.6 | 19.6 | 19.6 | 19.6 | 19.6 | 19.6 | 19.6 |
| Water | wt. % | 44.3 | 39.4 | 46.4 | 46.4 | 41.3 | 36.1 | 31.7 | 31.5 | 31.5 | 31.3 | 31.9 | 32.2 | 30.0 |
| KOH | wt. % | 0.5 | 0.6 | 0.4 | 0.4 | 0.4 | 0.4 | 0.5 | 0.7 | 0.7 | 0.9 | 0.3 | 0 | 0.5 |
| pH | | 10.9 | 10.9 | 10.9 | 10.9 | 10.9 | 10.9 | 10.5 | 10.9 | 10.9 | 11.8 | 10.0 | 4.0 | 10.9 |
| Visc.[f] | | | | | | | | | | | | | | |
| $10\ s^{-1}$[g] | mPas | 240 | 262 | 119 | 106 | 166 | 236 | 374 | 213 | 320 | 101 | 1290 | 1530 | 189 |
| $1{,}000\ s^{-1}$ | mPas | 45 | 58 | 33 | 29 | 37 | 51 | 76 | 64 | 77 | 55 | 115 | 470 | 69 |
| Diameter[h] | nm | 121 | 121 | 114 | 98 | 113 | 114 | 130 | 132 | 128 | 126 | 133 | 132 | 110 |

[c] grinding with a high-energy mill;
[d] after storage for three months;
[e] comparison example;
[f] viscosity at 23° C.;
[g] shear rate;
[h] aggregate diameter (median)

The invention claimed is:

1. A process for the preparation of a pourable silicon dioxide dispersion, comprising:
   supplying water, at least one polyol and optionally an additive from a reservoir and circulating the mixture of the water and polyol via a rotor/stator machine;
   while the rotor/stator is running, continuously or discontinuously introducing via a filling device a silicon dioxide powder to the mixture of the water and polyol;
   closing said filling device and continuing the dispensing until the current uptake of the rotor/stator machine is largely constant; and wherein said silicon oxide dispersion is pourable at room temperature.

2. The process according to claim 1, wherein the substance having an alkaline action is an aqueous solution having a concentration of 20 to 50 wt. %.

3. The process according to claim 1, wherein the addition of the polyol takes place only after the dispersing of the silicon dioxide powder and before the addition of the substance having an alkaline action.

4. A process for the preparation of a pourable silicon dioxide dispersion, comprising:

introducing initially into a dispersing vessel a mixture of water, at least one polyol, optionally an additive and silicon dioxide powder;

carrying out the dispersing by means of a planetary kneader at a pH of less than 7; and then adding a substance having an alkaline action in an amount so that a dispersion pH of 10 results such that no gel formation takes place;

to obtain said silicon dioxide dispersion which is stable and pourable;

wherein an average, number-related aggregate diameter of silicon dioxide particles in dispersion is less than 200 nm, said pourable silicon dioxide dispersion comprising:

at least 35 wt. % of said silicon dioxide powder, based on the total amount of the dispersion, 10 to 35 wt. % of said at least one polyol, based on the total amount of the dispersion, 20-55 wt. % of water, based on the total amount of the dispersion, 0 to 10 wt. % of an additive, based on the total amount of the dispersion, and said substance having an alkaline action in an amount so that a pH of 10 is established; and wherein said silicon oxide dispersion is pourable at room temperature.

5. The process according to claim 4, wherein the substance having an alkaline action is an aqueous solution having a concentration of 20 to 50 wt. %.

6. The process according to claim 4, wherein the addition of the polyol takes place only after the dispersing of the silicon dioxide powder and before the addition of the substance having an alkaline action.

7. A process for the preparation of a pourable silicon dioxide dispersion, comprising:

placing least two part streams of said dispersion prepared according to claim 1 under a pressure of up to 3,500 kg/cm$^2$ and letting said part streams down via a nozzle and allowing said part streams to collide with one another;

wherein an average, number-related aggregate diameter of silicon dioxide particles in dispersion is less than 200 nm, said pourable dispersion comprising:

at least 35 wt. % of said silicon dioxide powder, based on the total amount of the dispersion, 10 to 35 wt. % of said at least one polyol, based on the total amount of the dispersion, 20-55 wt. % of water, based on the total amount of the dispersion, 0 to 10 wt. % of said additive, based on the total amount of the dispersion, and said substance having an alkaline action in an amount so that a pH of 10<pH is established, and wherein said silicon oxide dispersion is pourable at room temperature.

8. A process for the preparation of a pourable silicon dioxide dispersion, comprising:

placing at least two part streams of a dispersion prepared according to claim 4 under a pressure of up to 3,500 kg/cm$^2$ and letting said part streams down via a nozzle and allowing said part streams to collide with one another;

wherein the average, number-related aggregate diameter of silicon dioxide particles in dispersion is less than 200 nm, said pourable dispersion comprising at least 35 wt. % of said silicon dioxide powder, based on the total amount of the dispersion, 10 to 35 wt. % of said at least one polyol, based on the total amount of the dispersion, 20-55 wt. % of water, based on the total amount of the dispersion, 0 to 10 wt. % of said additive, based on the total amount of the dispersion, and said substance having an alkaline action in an amount so that a pH of 10<pH≤12 is established, and wherein said silicon oxide dispersion is pourable at room temperature.

9. The process according to claim 1, wherein said silicon dioxide dispersion shows no noticeable sedimentation within a period of time of at least three months.

10. The process according to claim 1, wherein said silicon dioxide dispersion comprises no additives.

11. The process according to claim 1, wherein said silicon dioxide powder is prepared pyrogenically.

12. The process according to claim 11, wherein the pyrogenically prepared silicon dioxide powder has a specific surface area of 5 to 500 m$^2$/g.

13. The process according to claim 1, wherein said polyol is selected from the group consisting of glycerol, ethylene glycol, trimethylolpropane, pentaerythritol, sorbitol, polyvinyl alcohol, polyethylene glycol and mixtures thereof.

14. The process according to claim 1, wherein said substance having an alkaline action is selected from the group consisting of alkali metal hydroxides, amines, (alkyl)ammonium hydroxides, amino alcohols and mixtures thereof.

15. The process according to claim 1, wherein said pourable silicon dioxide dispersion comprises 38 to 60 wt. % of pyrogenically prepared silicon dioxide powder having a BET surface area of 30 to 60 m$^2$/g;

10 to 25 wt. % of glycerol;

25 to 50 wt. % of water; and 0.3 to 0.7 wt. % of KOH.

16. The process according to claim 4, wherein said silicon dioxide dispersion shows no noticeable sedimentation within a period of time of at least three months.

17. The process according to claim 4, wherein said silicon dioxide dispersion comprises no additives.

18. The process according to claim 4, wherein said silicon dioxide powder is prepared pyrogenically.

19. The process according to claim 18, wherein the pyrogenically prepared silicon dioxide powder has a specific surface area of 5 to 500 m$^2$/g.

20. The process according to claim 4, wherein said polyol is selected from the group consisting of glycerol, ethylene glycol, trimethylolpropane, pentaerythritol, sorbitol, polyvinyl alcohol, polyethylene glycol and mixtures thereof.

21. The process according to claim 4, wherein said substance having an alkaline action is selected from the group consisting of alkali metal hydroxides, amines, (alkyl)ammonium hydroxides, amino alcohols and mixtures thereof.

22. The process according to claim 4, wherein said pourable silicon dioxide dispersion comprises 38 to 60 wt. % of pyrogenically prepared silicon dioxide powder having a BET surface area of 30 to 60 m$^2$/g;

10 to 25 wt. % of glycerol;

25 to 50 wt. % of water; and 0.3 to 0.7 wt. % of KOH.

* * * * *